(12) United States Patent
Prechner et al.

(10) Patent No.: US 9,756,598 B2
(45) Date of Patent: Sep. 5, 2017

(54) APPARATUS, SYSTEM AND METHOD OF ONE-SIDED ROUND-TRIP-TIME (RTT) MEASUREMENT

(71) Applicant: INTEL IP CORPORATION, Santa Clara, CA (US)

(72) Inventors: Gaby Prechner, Rishon Lezion (IL); Itai Steiner, Tel Aviv (IL); Kobi Kopelman, Tel Aviv (IL); Leor Banin, Petach Tikva (IL)

(73) Assignee: INTEL IP CORPORATION, Santa Clara, CA (US)

( * ) Notice: Subject to any disclaimer, the term of this patent is extended or adjusted under 35 U.S.C. 154(b) by 138 days.

(21) Appl. No.: 14/748,525

(22) Filed: Jun. 24, 2015

(65) Prior Publication Data

US 2016/0198429 A1   Jul. 7, 2016

Related U.S. Application Data

(60) Provisional application No. 62/100,146, filed on Jan. 6, 2015.

(51) Int. Cl.
| | |
|---|---|
| *H04W 64/00* | (2009.01) |
| *G01S 5/02* | (2010.01) |
| *G01S 5/14* | (2006.01) |
| *G01S 13/76* | (2006.01) |
| *G01S 13/87* | (2006.01) |
| *H04W 84/12* | (2009.01) |

(52) U.S. Cl.
CPC .......... *H04W 64/00* (2013.01); *G01S 5/0236* (2013.01); *G01S 5/14* (2013.01); *G01S 13/767* (2013.01); *G01S 13/876* (2013.01); *H04W 84/12* (2013.01)

(58) Field of Classification Search
CPC ...... H04W 64/00; H04W 24/00; H04W 4/023
USPC .......................................... 455/456.1, 456.5
See application file for complete search history.

(56) References Cited

U.S. PATENT DOCUMENTS

| | | | |
|---|---|---|---|
| 2010/0135178 A1* | 6/2010 | Aggarwal | G01S 5/0205 370/252 |
| 2012/0294231 A1* | 11/2012 | Finlow-Bates | H04W 48/14 370/328 |
| 2014/0160951 A1 | 6/2014 | Alpert et al. | |
| 2014/0162683 A1 | 6/2014 | Rochberger et al. | |
| 2014/0185520 A1* | 7/2014 | Gao | H04W 64/00 370/328 |
| 2014/0187257 A1* | 7/2014 | Emadzadeh | G01S 5/0242 455/456.1 |

OTHER PUBLICATIONS

Search Report for European Patent Application No. 15198313.7 mailed on May 18, 2016, 10 pages.

(Continued)

*Primary Examiner* — Dung Hong
(74) *Attorney, Agent, or Firm* — Shichrur & Co.

(57) ABSTRACT

Some demonstrative embodiments include apparatuses, devices, systems and methods of one-sided Round-Trip-Time (RTT) measurement. For example, an apparatus may include circuitry and logic configured to cause a mobile device to receive bias information of an Access-Point (AP); perform a one-sided round-trip-time (RTT) measurement with the AP; and estimate a range between the mobile device and the AP based on the one-sided RTT measurement and the bias information.

7 Claims, 6 Drawing Sheets

(56) References Cited

OTHER PUBLICATIONS

Office Action for Taiwanese Patent Application No. 104140315 mailed on Oct. 26, 2016, 11 pages (Including 5 pages of English translation).
Office Action for Taiwanese Patent Application No. 104140315, dated Apr. 20, 2017, 13 pages (Including 6 pages of English translation).

* cited by examiner

APPARATUS, SYSTEM AND METHOD OF ONE-SIDED ROUND-TRIP-TIME (RTT) MEASUREMENT

CROSS REFERENCE

This application claims the benefit of and priority from U.S. Provisional Patent Application No. 62/100,146 entitled "Apparatus, System and Method of One-Sided Round-Trip-Time (RTT) Measurement", filed Jan. 6, 2015, the entire disclosure of which is incorporated herein by reference.

TECHNICAL FIELD

Embodiments described herein generally relate to one-sided Round-Trip-Time (RTT) measurement.

BACKGROUND

Outdoor navigation is widely deployed thanks to the development of various global-navigation-satellite-systems (GNSS), e.g., Global Positioning System (GPS), GALILEO, and the like.

Recently, there has been a lot of focus on indoor navigation. This field differs from the outdoor navigation, since the indoor environment does not enable the reception of signals from GNSS satellites. As a result, a lot of effort is being directed towards solving the indoor navigation problem.

This problem does not yet have a scalable solution with satisfactory precision.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
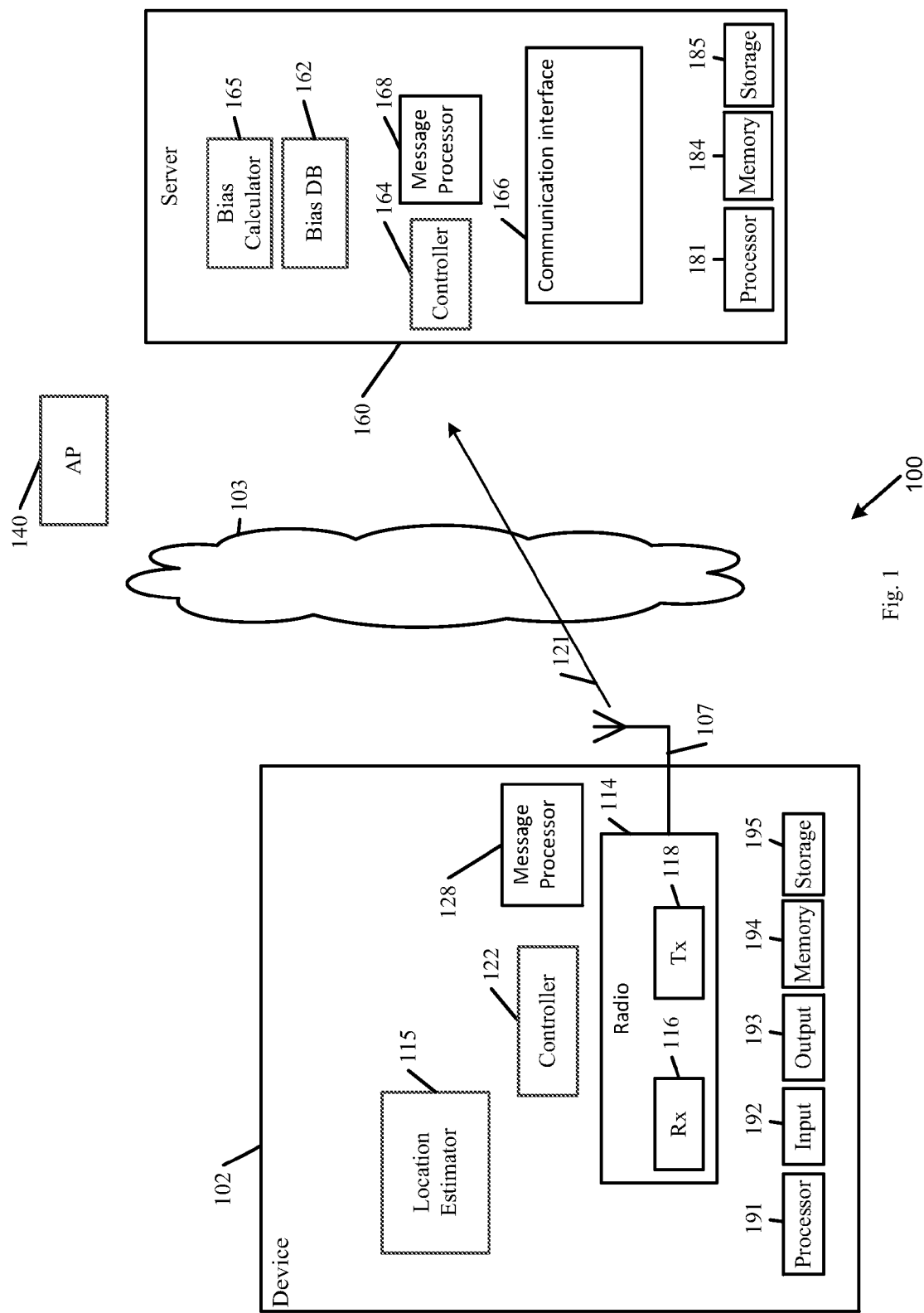
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication device, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Wireless Fidelity (WiFi) Alliance (WFA) Specifications, devices and/or networks operating in accordance with existing WFA Peer-to-Peer (P2P) specifications (WiFi P2P technical specification, version 1.5, Aug. 4, 2014) and/or future versions and/or derivatives thereof, devices and/or networks operating in accordance with existing Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6GHz", December, 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band", 28 Dec., 2012); and/or IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification")) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used in conjunction with a WLAN, e.g., a wireless fidelity (WiFi) network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 2.4 or 5 Gigahertz (GHz). However, other embodiments may be implemented utilizing any other suitable wireless communication frequency bands, for example, a 60 GHz band, a millimeterWave (mmWave) frequency band, a Sub 1 GHz (S1G) frequency band, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices capable of communicating content, data, information, audio, video, and/or signals via a wireless medium (WM) 103. For example, system 100 may include a wireless communication device 102, and/or a wireless communication device 140.

In some demonstrative embodiments, wireless medium 103 may include, for example, a radio channel, an RF channel, a Wireless Fidelity (WiFi) channel, a cellular channel, an IR channel, and the like. One or more elements of system 100 may optionally be capable of communicating over any suitable wired communication links.

In some demonstrative embodiments, device 102 may include a mobile or a portable device.

In some demonstrative embodiments, device 102 may include, for example, a User Equipment (UE), a Mobile device (MD), a wireless Station (STA), a mobile computer, a laptop computer, an Internet of Things (IoT) device, a notebook computer, a tablet computer, an Ultrabook™ computer, a mobile internet device, a handheld computer, a handheld device, a PDA device, a handheld PDA device, an on-board device, an off-board device, a hybrid device (e.g., combining cellular phone functionalities with PDA device functionalities), a consumer device, a mobile or portable device, a mobile phone, a cellular telephone, a PCS device, a PDA device which incorporates a wireless communication device, a mobile or portable GPS device, a relatively small computing device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Personal Media Player (PMP), a digital video camera (DVC), a gaming device, a Smartphone, or the like.

In some demonstrative embodiments, device 140 may include, or may perform the functionality of, an Access Point (AP), e.g., as described below.

For example, the AP may include a router, a PC, a server, a Hot-Spot and/or the like.

In some demonstrative embodiments, device 140 may include a non-mobile or a static device.

In some demonstrative embodiments, device 140 may include, for example, a desktop computer, a router, a server, and/or any other device configured to perform the functionality of an AP.

In some demonstrative embodiments, device 102 may perform the functionality of a non-AP STA, and/or device 140 may perform the functionality of an AP STA.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195. Device 102 may optionally include other suitable hardware components and/or software components. In some demonstrative embodiments, some or all of the components of one or more of device 102 may be enclosed in a common housing or packaging, and may be interconnected or operably associated using one or more wired or wireless links. In other embodiments, components of one or more of device 102 may be distributed among multiple or separate devices.

Processor 191 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

Input unit 192 includes, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

Memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative embodiments, wireless communication medium 103 may include a wireless communication channel over a 2.4 GHz frequency band, a 5 GHz frequency band, a millimeterWave (mmWave) frequency band, e.g., a 60 GHz frequency band, a S1G band, and/or any other frequency band.

In some demonstrative embodiments, wireless communication device 102 and/or AP 140 may form, and/or communicate as part of, a wireless local area network (WLAN).

In some demonstrative embodiments, wireless communication device 102 and/or AP 140 may form, and/or communicate as part of, a WiFi network.

In some demonstrative embodiments, wireless communication device 102 and/or AP 140 may form, and/or communicate as part of, a WiFi Direct (WFD) network, e.g., a WiFi direct services (WFDS) network, and/or may perform the functionality of one or more WFD devices.

In other embodiments, wireless communication device 102 and/or AP 140 may form, and/or communicate as part of, any other network and/or perform the functionality of any other wireless devices or stations.

In some demonstrative embodiments, device 102 may include one or more radios including circuitry and/or logic to perform wireless communication between devices 102, 140 and/or one or more other wireless communication devices, e.g., over wireless medium 103.

In some demonstrative embodiments, device 102 may include a radio 114 to communicate with device 140 over a WLAN channel.

For example, radio 114 may be configured to communicate over a WLAN link, a Wireless Fidelity (WiFi) link, a Point to Point (PTP) link, a WiFi Direct (WFD) link, a Wireless Gigabit (WiGig) link, and/or any other link.

In some demonstrative embodiments, radio 114 may include one or more wireless receivers (Rx) including circuitry and/or logic to receive wireless communication signals, RF signals, frames, blocks, transmission streams, packets, messages, data items, and/or data. For example, radio 114 may include a receiver 116.

In some demonstrative embodiments, radio 114 may include one or more wireless transmitters (Tx) including circuitry and/or logic to send wireless communication signals, RF signals, frames, blocks, transmission streams, packets, messages, data items, and/or data. For example, radio 114 may include a transmitter 118.

In some demonstrative embodiments, radio 114 may include circuitry, logic, modulation elements, demodulation elements, amplifiers, analog to digital and digital to analog converters, filters, and/or the like. For example, radio 114 may include or may be implemented as part of a wireless Network Interface Card (NIC), and the like.

In some demonstrative embodiments, radio 114 may include, or may be associated with, one or more antennas 107.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. Antennas 107 may include, for example, antennas suitable for directional communication, e.g., using beamforming techniques. For example, antennas 107 may include a phased array antenna, a multiple element antenna, a set of switched beam antennas, and/or the like. In some embodiments, antennas 107 may implement transmit and receive functionalities using separate transmit and receive antenna elements. In some embodiments, antennas 107 may implement transmit and receive functionalities using common and/or integrated transmit/receive elements.

In some demonstrative embodiments, antennas 107 may include a directional antenna, which may be steered to a plurality of beam directions.

In some demonstrative embodiments, device 102 may include a controller 124. Controller 124 may be configured to perform one or more communications, operations and/or procedures between wireless communication device 102 and AP 140, and/or one or more other devices, e.g., as described below.

In some demonstrative embodiments, controller 124 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, configured to cause, to trigger, to initiate, to request, and/or to instruct a wireless device, e.g., device 102, and/or a wireless station, e.g., a wireless STA implemented by device 102, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below. In one example, message processor 128 may be configured to process transmission of one or more messages from a wireless station, e.g., a wireless STA implemented by device 102; and/or message processor 128 may be configured to process reception of one or more messages by a wireless station, e.g., a wireless STA implemented by device 102.

In some demonstrative embodiments, message processor 128 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below In some demonstrative embodiments, at least part of the functionality of message processor 128 may be implemented as part of radio 114.

In some demonstrative embodiments, at least part of the functionality of message processor 128 may be implemented as part of controller 124.

In other embodiments, the functionality of message processor 128 may be implemented as part of any other element of device 102.

In some demonstrative embodiments, device 102 may include a location estimator 115 configured to estimate a location of device 102, e.g., as described below.

In some demonstrative embodiments, location estimator 115 may include circuitry and/or logic, e.g., one or more processors including circuitry and/or logic, memory circuitry and/or logic, and/or any other circuitry and/or logic, configured to perform the functionality of location estimator 115. Additionally or alternatively, one or more functionalities of location estimator 115 may be implemented by logic, which may be executed by a machine and/or one or more processors, e.g., as described below. In some demonstrative embodiments, at least part of the functionality of location estimator 115 may be implemented as part of controller 124.

In other embodiments, the functionality of location estimator 115 may be implemented as part of any other element of device 102.

In some demonstrative embodiments, at least part of the functionality of controller 124, message processor 128, and/or location estimator 115 may be implemented by an integrated circuit, for example, a chip, e.g., a System in Chip (SoC). In one example, the chip or SoC may be configured to perform one or more functionalities of radio 114. For example, the chip or SoC may include one or more elements of controller 124, one or more elements of message processor 128, one or more elements of location estimator 115, and/or one or more elements of radio 114. In one example, controller 124, message processor 128, location estimator 115, and radio 114 may be implemented as part of the chip or SoC.

In some demonstrative embodiments, location estimator 115 may be configured to estimate the location of device 102, for example, based on time based range measurements, for example, with device 140 and/or one or more other devices.

In some demonstrative embodiments, the time based range measurements may be performed using WLAN communications, e.g., WiFi.

In one example, using the WLAN communications to perform the time based range measurements may enable, for example, to increase an indoor location accuracy of the location estimation of device 102, e.g., in an indoor environment.

In some demonstrative embodiments, the time based range measurements may include a round trip time (RTT) measurement (also referred to as Time of Flight (ToF), or Fine Time Measurement (FTM)).

Figure 2:
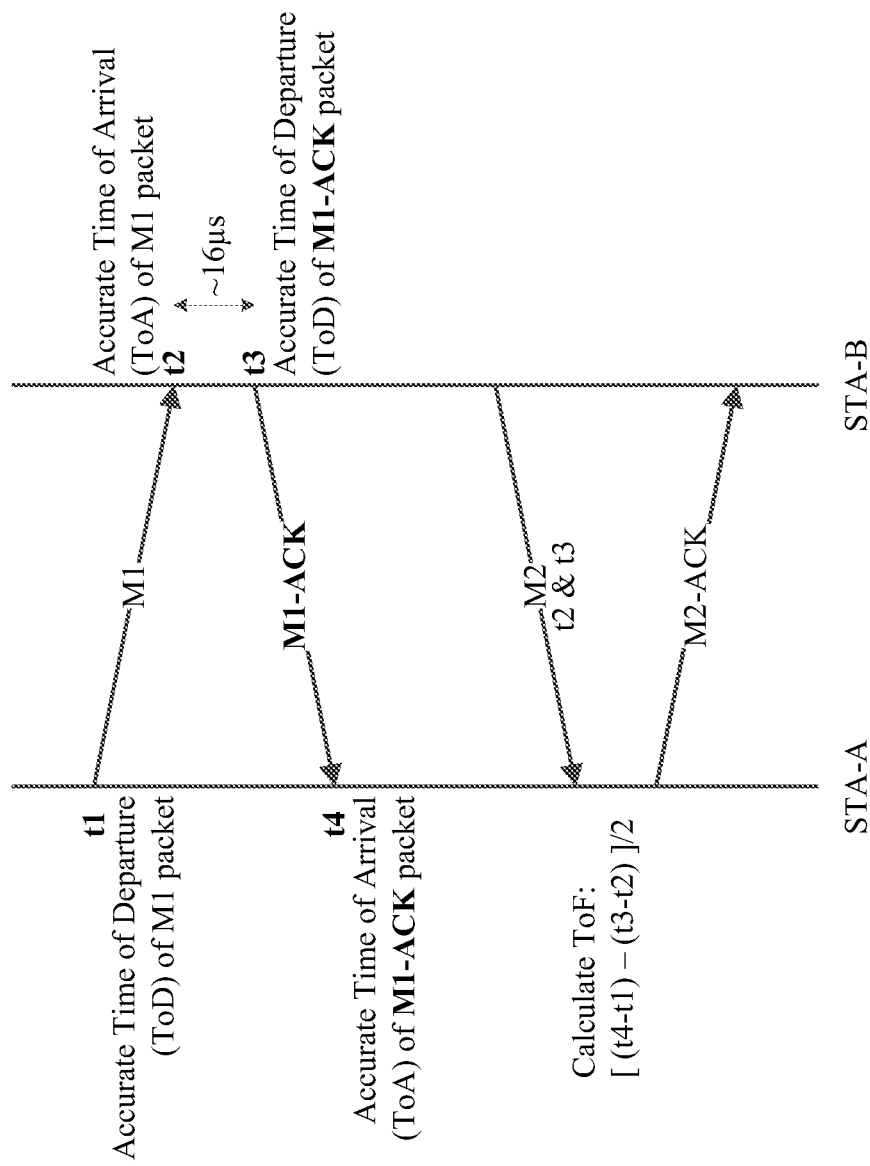
FIG. 2 is a schematic illustration of a Round-Trip-Time (RTT) measurement procedure, in accordance with some demonstrative embodiments.

Reference is made to FIG. 2, which schematically illustrates a RTT measurement procedure between a first device (STA-A) and a second device (STA-B), in accordance with some demonstrative embodiments. In one example, device 102 (FIG. 1) may perform the functionality of STA-A, and/or device 140 (FIG. 1) may perform the functionality of STA-B.

In some demonstrative embodiments, one or more of the operations of the procedure of FIG. 2 may be performed by the first and second devices, for example, in order to determine at least one location-related parameter, e.g., a relative location ("range") of the STA-A with respect to the second device, e.g., as described below.

In some demonstrative embodiments, the STA-A may transmit a message, denoted M1, to the STA-B, at a time, denoted t1, e.g., in an unassociated manner. The time t1 may be a Time of Departure (ToD), denoted ToD(M1), of the message M1.

In some demonstrative embodiments, the STA-B may receive the message M1 and determine a time, denoted t2, e.g., by determining a Time of Arrival (ToA), denoted ToA(M1), of the message M1.

In some demonstrative embodiments, the STA-B may transmit a message, denoted M1-ACK, to the STA-A, at a time, denoted t3. The message M1-ACK may include, for example, an acknowledgement message transmitted in response to the message M1. The time t3 may be a ToD, denoted ToD(M1-ACK), of the message M1-ACK.

In some demonstrative embodiments, the STA-A may receive the message M1-ACK and determine a time, denoted t4, e.g., by determining a ToA, denoted ToA(M1-ACK), of the message M1-ACK.

In some demonstrative embodiments, the STA-B may transmit a message, denoted M2, to the STA-A. Message M2 may include, for example, information corresponding to the time t2 and/or the time t3. For example, message M2 may include a timestamp, e.g., a ToA timestamp, including the time t2, and a timestamp, e.g., a ToD timestamp, including the time t3.

In some demonstrative embodiments, the STA-A may receive message M2. STA-A may determine a ToF between the STA-A and the STA-B, for example, based on message M2.

For example, the STA-A may determine an average ToF based on a calculation to applied to the time values t1, t2, t3 and t4. For example, the STA-A may determine the ToF, e.g., as follows:

$$\text{ToF}=[(t4-t1)-(t3-t2)]/2 \qquad (1)$$

In some demonstrative embodiments, the STA-A may transmit a message, denoted M2-ACK, to the STA-B. Message M2-ACK may include, for example, an acknowledgement message transmitted in response to message M2.

In some demonstrative embodiments, the STA-A may determine the range between the STA-A and the STA-B based on the determined ToF.

For example, the STA-A may determine the range, denoted $r_k$, e.g., as follows:

$$r_k=\text{ToF}*C \qquad (2)$$

wherein C denotes the radio wave propagation speed, e.g., the speed of light.

In some demonstrative embodiments, the STA-A may determine a location of the STA-A, e.g., an absolute location of STA-A, based on the estimated range $r_k$, e.g., as described below.

For example, the STA-A may determine two or more ToF values and/or range values, e.g., according to Equations 1 and/or 2, with respect to two or more respective other devices, e.g., at least three or four other devices, and may determine the location of the STA-A based on the two or more ToF values, for example, by trilateration.

In some demonstrative embodiments, as shown in FIG. 2, the STA-A may calculate the time stamps t1 and t4, and the STA-B may calculate the time stamps t2 and t3. In one example, both the STA-A and the STA-B may support ToF, for example, to calculate these time stamps.

In some demonstrative embodiments, the STA-A, e.g., device 102 (FIG. 1), may be configured to perform a one-sided RTT measurement (also referred to as "1-sided RTT measurement").

In some demonstrative embodiments, the one-sided RTT measurement may include an RTT measurement between a first device and a second device, in which the first device calculates the range between the first and second devices, for example, using only the time stamps t1 and t4, e.g., without using the time stamps t2 and t3. For example, the first device may be configured to calculate the range between the first and second devices, for example, without receiving the time stamps t2 and t3 from the second device, e.g., without receiving the message M2 from the second device.

In some demonstrative embodiments, the STA-A may assume that the time difference between time stamps t3 and t2, for example, the time difference t3-t2, e.g., the time difference between the end of the message M1 and the beginning of the message M1-ACK, may be a known, e.g., preset, constant value.

In some demonstrative embodiments, the STA-A may be capable to estimate the location of the STA-A, for example, using the time stamps t1 and t4, and the known constant value of the difference, e.g., according to Equation 1.

In some demonstrative embodiments, the one-sided RTT measurement may be used, for example, as a technology gap filler, which may, for example, allow ToF capable devices to measure a range from a device ("legacy device"), which does not support accurate time based measurements, e.g. does not support determining the time difference t3-t2.

In some demonstrative embodiments, location estimator 115 (FIG. 1) may use the one-sided RTT measurement to estimate the location of device 102 (FIG. 1), for example, using the known constant value, e.g., even if device 140 (FIG. 1) does not support accurate time based measurements.

In some demonstrative embodiments, the time difference between time stamps t3 and t2 may be, for example, in an ideal scenario, exactly 16 microseconds (μs), e.g., a short inter-frame space (SIFS).

In some demonstrative embodiments, the assumption that the time difference between time stamps t3 and t2 ("the bias") is equal to 16 µs has been found to be incorrect.

In one example, different devices, e.g., devices of different WiFi vendors, devices having different versions and/or the like, may have a bias error, e.g., of a several hundreds of nanoseconds, e.g., from the nominal value of the bias, e.g., 16 µs.

In some demonstrative embodiments, the bias error may cause an error of hundreds of meters in a location estimation of a mobile device.

Referring back to FIG. 1, some demonstrative embodiments may be implemented to enable to reduce or to eliminate the bias error, for example, in a way, which may enable to increase an accuracy of the one-sided RTT measurement.

In some demonstrative embodiments, a procedure, which includes attempting to guess the bias error of each range, and cancelling the optional results, for example, by doing map matching over time may be disadvantageous. For example, such a procedure may be inapplicable for a single fix. Additionally or alternatively, this procedure may cause a high latency for navigation in most of the cases, e.g., as the convergence to a single solution in the map might take a lot of time. Additionally or alternatively, this procedure may require calculating the bias for each AP, thereby causing an inconsistent user experience.

Some demonstrative embodiments may enable to provide AP bias information of an AP to a mobile device to perform a one-sided RTT measurement with the AP, e.g., as described below.

In some demonstrative embodiments, system 100 may include a server 160 configured to provide to device 102 AP bias information of device 140, for example, to enable device 102 to perform the one-sided RTT measurement with device 104.

In some demonstrative embodiments, server 160 may include a web server, a cloud server, an online Database (DB), and/or any other suitable web service.

In some demonstrative embodiments, server 160 may include one or more servers, one or more modules, one or more applications, one or more interfaces, and/or any other components configured to provide and/or to calculate AP bias information.

In some demonstrative embodiments, server 160 may include a bias DB 162, configured to maintain, store and/or save the AP bias information of device 140.

In some demonstrative embodiments, bias DB 162 may be configured to store a plurality of AP bias information elements corresponding to a plurality of APs having a respective plurality of identifiers, e.g., as described below.

In one example, bias DB 162 may be configured to map between a device, e.g., each AP or each AP vendor, to a BIAS, e.g., a bias representing a correct bias, or an estimation of the correct bias of the device. For example, the bias DB 162 may include a plurality of AP-specific bias values mapped to a plurality of APs, e.g., to a plurality of AP identifiers and/or AP vendor identifiers, and/or any other identifier to identify one or more APs to which an AP-specific bias corresponds.

In some demonstrative embodiments, server 160 may include a controller 164. Controller 164 may be configured to perform one or more communications, operations and/or procedures between server 160, device 102 and/or any other mobile devices, e.g., as described below.

In some demonstrative embodiments, controller 164 may include circuitry and/or logic, e.g., one or more processors including circuitry and/or logic, memory circuitry and/or logic, and/or any other circuitry and/or logic, configured to perform the functionality of controller 164. Additionally or alternatively, one or more functionalities of controller 164 may be implemented by logic, which may be executed by a machine and/or one or more processors. For example, one or more functionalities of controller 164 may be implemented by a Software, a firmware, an application, a software module, an OS, and/or the like, e.g., as described below.

In some demonstrative embodiments, server 160 may include a message processor 168 configured to generate, process and/or access one or messages communicated by server 160.

In one example, message processor 168 may be configured to generate one or more messages to be transmitted by server 160, and/or message processor 168 may be configured to access and/or to process one or more messages received by server 160, e.g., as described below.

In some demonstrative embodiments, message processor 168 may include circuitry, e.g., processor circuitry and/or logic, memory circuitry and/or logic, and/or any other circuitry, configured to perform the functionality of message processor 168. Additionally or alternatively, one or more functionalities of message processor 168 may be implemented by logic, which may be executed by a machine and/or one or more processors. For example, one or more functionalities of message processor 168 may be implemented by a Software, a firmware, an application, a software module, an OS, and/or the like, e.g., as described below.

In some demonstrative embodiments, at least part of the functionality of message processor 168 may be implemented as part of communication interface 166.

In some demonstrative embodiments, at least part of the functionality of message processor 168 may be implemented as part of controller 164.

In other embodiments, the functionality of message processor 128 may be implemented as part of any other element of server 160.

In some demonstrative embodiments, server 160 may include a bias calculator 165 configured to calculate the AP bias information of device 140, e.g., as described below.

In some demonstrative embodiments, bias calculator 165 may include circuitry and/or logic, e.g., one or more processors including circuitry and/or logic, memory circuitry and/or logic, and/or any other circuitry and/or logic, configured to perform the functionality of bias calculator 165. Additionally or alternatively, one or more functionalities of bias calculator 165 may be implemented by logic, which may be executed by a machine and/or one or more processors, e.g., as described below. For example, one or more functionalities of bias calculator 165 may be implemented by a Software, a Firmware, an application, a software module, an OS, and/or the like In some demonstrative embodiments, at least part of the functionality of bias calculator 165 may be implemented as part of controller 164.

In some demonstrative embodiments, server 160 may include a communication interface 166 configured to communicate with device 102 and/or one or more other mobile devices.

In some demonstrative embodiments, communication interface 166 may communicate via a wireless communication network, a wired communication network, and/or any other combination of wired communication and/or wireless communication networks.

In some demonstrative embodiments, communication interface 166 may include a web interface, a software interface, a hardware interface, and/or any other suitable communication interface to communicate with mobile device 102 and/or any other mobile devices.

In one example, communication interface 166 may communicate with mobile device 102 via the Internet and a cellular network.

In another example, communication interface 166 may communicate with mobile device 102 via a WiFi connection between devices 102 and 140 to connect device 102 to the Internet.

In some demonstrative embodiments, server 160 may also include, for example, one or more of a processor 181, a memory unit 184, and/or a storage unit 185. Server 160 may optionally include other suitable hardware components and/or software components. In some demonstrative embodiments, some or all of the components of one or more of server 160 may be enclosed in a common housing or packaging, and may be interconnected or operably associated using one or more wired or wireless links. In other embodiments, components of one or more of server 160 may be distributed among multiple or separate devices.

Processor 181 includes, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 181 executes instructions, for example, of an Operating System (OS) of server 160 and/or of one or more suitable applications.

Memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 185 includes, for example, a hard disk drive, a floppy disk drive, a Compact Disk (CD) drive, a CD-ROM drive, a DVD drive, or other suitable removable or non-removable storage units. Memory unit 184 and/or storage unit 185, for example, may store data processed by server 160.

In some demonstrative embodiments, device 102 may use the AP bias information of device 140, as received from server 160, for example, to perform one-sided RTT measurement with device 140, e.g., as describe below.

In some demonstrative embodiments, device 102 may receive the AP bias information of device 140.

In some demonstrative embodiments, device 102 may receive the AP bias information of device 140 from server 160.

In some demonstrative embodiments, device 102 may send to server 160 a request 121 to receive the AP bias information of device 140.

In some demonstrative embodiments, server 160 may send the AP bias information of device 140, for example, in response to the request 121 from device 102.

In some demonstrative embodiments, message processor 128 may generate request 121, and transmitter 116 may transmit request 121 to server 160.

In some demonstrative embodiments, request 121 may include an identifier of device 140.

In some demonstrative embodiments, server 160 may receive request 121 to receive the AP bias information of device 140.

In some demonstrative embodiments, server 160 may determine the AP bias information of device 140 based on the identifier in request 121.

In some demonstrative embodiments, server 160 may retrieve from bias DB 162 the AP bias information of device 140, for example, from the plurality of AP bias information elements corresponding to the plurality of APs.

In some demonstrative embodiments, server 160 may retrieve the AP bias information of device 140 from the plurality of AP bias information elements, for example, based on the identifier of device 140, e.g., included request 121.

In some demonstrative embodiments, server 160 may send the AP bias information of device 140 to device 102.

In some demonstrative embodiments, message generator 168 may generate a message including the AP bias information of device 140, and communication interface 166 may send the message to device 102.

In some demonstrative embodiments, device 102 may receive the AP bias information of device 140, and may perform the one-sided RTT measurement with device 140, e.g., using the AP bias information of device 140.

In some demonstrative embodiments, location estimator 115 may perform a one-sided RTT measurement with device 140, for example, using the AP bias information of device 140.

In some demonstrative embodiments, location estimator 115 may estimate a range between the mobile device 102 and device 140, for example, based on the one-sided RTT measurement and the AP bias information of device 140. For example, location estimator 115 may estimate the range between the mobile device 102 and device 140 according to Equation 1, e.g., using the AP bias information of device 140, for example, instead of the time difference between time stamps t3 and t2.

In some demonstrative embodiments, location estimator 115 may estimate the location of mobile device 102, for example, based on the range between device 102 and AP 140, and one or more other ranges, for example, at least two other ranges between device 102 and two or more other APs, e.g., using trilateration.

In some demonstrative embodiments, estimating the location of mobile device 102, for example, based on the AP bias information of device 140, may enable to increase accuracy of the location of mobile device 102, and/or may lead to better usage of the one-sided RTT measurement.

Figure 3:
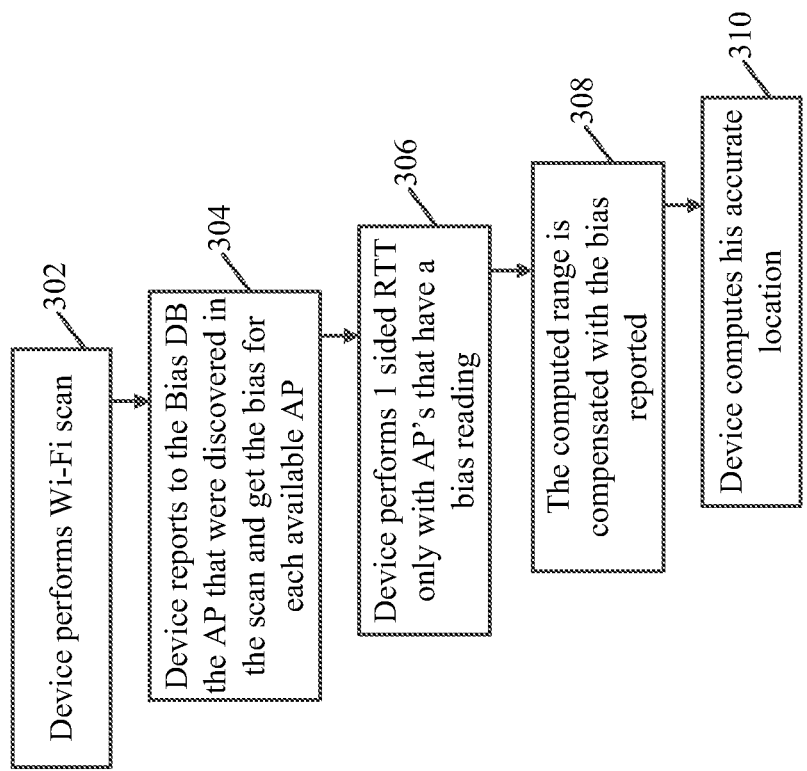
FIG. 3 is a schematic flow-chart illustration of a method of location estimation based on a one-sided RTT measurement, in accordance with some demonstrative embodiments.

Reference is made to FIG. 3, which schematically illustrates a method of location estimation based on a one-sided RTT measurement, in accordance with some demonstrative embodiments. For example, one or more of the operations of FIG. 3 may be performed by a mobile device, for example, device 102 (FIG. 1), to estimate a location of the mobile device based on the a one-sided RTT measurement with an AP, e.g., device 140 (FIG. 1).

As indicated at block 302, the method may include performing a scan, e.g., a WiFi scan, to scan for one or more APs. For example, device 102 (FIG. 1) may perform a scan to scan for one or more APs, e.g., device 140 (FIG. 1).

As indicated at block 304, the method may include receiving one or more bias values corresponding to one or more detected APs, for example, based on one more identifiers of the one or more detected APs. For example, device 102 (FIG. 1) may request from server 160 (FIG. 1) the AP bias information of one or more APs, for example, including device 140 (FIG. 1), e.g., if device 140 (FIG. 1) is detected by the scan.

As indicated at block 306, the method may include performing 1-sided RTT measurements to compute one or more ranges with one or more APs, e.g., one or more detected APs for which a bias value is available. In one example, device 102 (FIG. 1) may perform the 1-sided RTT measurements, for example, only with APs for which AP bias information has been received, e.g., from server 160 (FIG. 1). For example, device 102 (FIG. 1) may perform the 1-sided RTT measurement with device 140, e.g., as described above.

As indicated at block 308, the method may include compensating a computed range according to the 1-sided measurement with an AP based on the AP bias information of the AP. For example, location estimator 115 (FIG. 1) may estimate the range between devices 102 and 140 (FIG. 1), based on the AP bias information of device 140 (FIG. 1), e.g., as described above.

As indicated at block 310, the method may include estimating the location of the mobile device, for example, based on the computed ranges. For example, location estimator 115 (FIG. 1) may estimate the location of device 102 (FIG. 1), for example, based on the estimated range between devices 102 and 140 (FIG. 1), e.g., as described above.

Referring back to FIG. 1, in some demonstrative embodiments, server 160 may be configured to calculate a plurality of AP bias information elements corresponding to a plurality of APs.

In some demonstrative embodiments, server 160 may be configured to maintain and/or to update the plurality of AP bias information elements in bias DB 162.

In some demonstrative embodiments, one or more elements of the plurality of AP bias information elements in bias DB 162 may be determined, for example, using a crowd sourcing scheme, e.g., as described below.

In some demonstrative embodiments, one or more elements of the plurality of AP bias information elements in bias DB 162 may be preconfigured and/or preset.

In some demonstrative embodiments, one or more elements of the plurality of AP bias information elements in bias DB 162 may be generated and/or determined manually, for example, by selectively measuring one or more APs, e.g., several and/or leading APs, in a controlled environment, for example, by taking measurements of known ranges to determine a one or more respective bias values of the one or more APs.

In some demonstrative embodiments, server 160 may be configured to calculate the plurality of AP bias information elements in bias DB 162, for example, using information from one or more wireless devices, e.g., according to a crowd sourcing scheme.

In some demonstrative embodiments, server 160 may be configured to calculate the AP bias information of AP 140, for example, based on information corresponding to device 140 from one or more wireless devices.

In some demonstrative embodiments, server 160 may be configured to receive from a plurality of wireless devices a plurality of reports corresponding to device 140.

In some demonstrative embodiments, a report from a wireless device may include an identifier of device 140, and a calculated range between the wireless device and device 140.

In one example, device 102 may be configured to send one or more reports to server 160.

In some demonstrative embodiments, device 102 may be configured to perform one or more range measurements with one or more APs, and to send one or more reports including the range measurements and one or more identifiers of the one or more APs.

In some demonstrative embodiments, device 102 may be configured to perform one or more measurements with device 140, and to send to server 160 a report including the range measurements with device 140.

In some demonstrative embodiments, message processor 128 may generate the report, and transmitter 118 may send the report to server 160.

In some demonstrative embodiments, the report from device 102 to server 160 may include the estimated range between device 102 and 140 and an identifier of device 140.

In some demonstrative embodiments, bias calculator 165 may be configured to determine the AP bias information of device 140, for example, based on the plurality of reports from the plurality of wireless devices, e.g., including the report from device 102, and mapping information corresponding to a location of device 140.

In some demonstrative embodiments, bias calculator 165 may determine the AP bias information of device 140, for example, based on a minimal calculated range in the plurality of reports.

In some demonstrative embodiments, bias calculator 165 may determine an estimated location of a wireless device from which the minimal calculated range is reported, for example, based on the mapping information.

In some demonstrative embodiments, bias calculator 165 may determine the AP bias information of device 140, for example, based on the location of device 140 and the estimated location of the wireless device.

In some demonstrative embodiments, bias calculator 165 may update the AP bias information of device 140, based on a received report including a calculated range, which is shorter than the minimal calculated range.

In one example, device 140 may be located in a room, and server 160 may receive 3 reports including the respective calculated ranges of 2, 2.5 and 3 meters from device 140. According to this example, a minimal possible range to device 140 may be 0 meters, e.g., if a wireless device is in close proximity to device 140, and the minimal calculated range may be 2 meters. Bias calculator 165 may determine that a range of 2 meters, e.g., 2−0=2, may correspond to the AP bias information of device 140. Bias calculator 165 may update the AP bias information of device 140, for example, if server 160 receives a report including a calculated range, which is lesser than 2 meters.

In another example, the location of device 140 may be on a ceiling of a mall, e.g., at a height of 5 meters from the floor level, and server 160 may receive 3 reports including the respective calculated ranges of 5.5, 6 and 7 meters. According to this example, a minimal possible range to device 140 may be about 4 meters, which is a location of a wireless device on a user carrying the wireless device under the ceiling, and the minimal calculated range may be 5.5 meters. Bias calculator 165 may determine that a range of 1.5 meters, e.g., 5.5−4=1.5, correspond to the AP bias information of device 140. Bias calculator 165 may update the AP bias information of device 140, for example, if server 160 receives a report including a calculated range, which is lesser than 5.5 meters.

Figure 4:
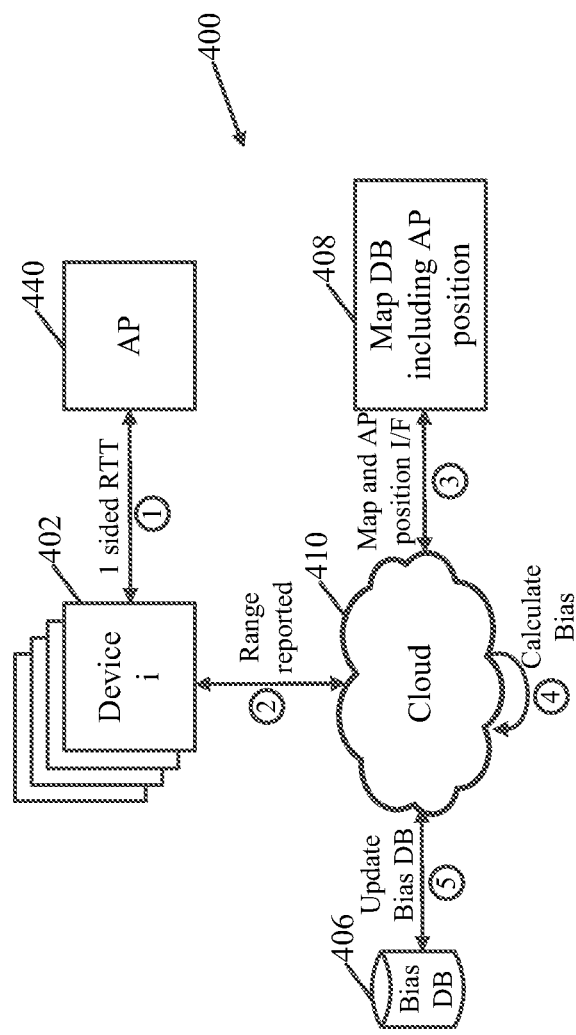
FIG. 4 is a diagram of operations between elements of a system, in accordance with some demonstrative embodiments.

Reference is made to FIG. 4, which schematically illustrates a diagram of operations between elements of a system 400, in accordance with some demonstrative embodiments. For example, one or more elements of system 400 may perform the functionality of one or more elements of system 100 (FIG. 1).

In some demonstrative embodiments, one or more operations of FIG. 4 may be performed, for example, as part of a method of gathering one or more AP bias information values, e.g., for creating and/or updating the Bias DB 162 (FIG. 1), for example, based on crowd sourcing from various devices, and extracting the AP bias information values, e.g., using mapping information.

In some demonstrative embodiments, system 400 may include a plurality of mobile devices 402, one or more APs 440, a bias DB 406, and a Map DB 408 including positions of one or more of APs 440.

In some demonstrative embodiments, system 400 may include a server 410, e.g., a cloud server, which may be configured to calculate the AP bias information corresponding to an AP, and/or to update the bias DB 406. For example, server 410 may perform the functionality of server 160 (FIG. 1).

In some demonstrative embodiments, server 410 may include, for example, one or more servers capable of communicating via one or more wireless communication technologies, and/or one or more wired communication technologies, and the like.

In some demonstrative embodiments, server 410 may include, for example, a bias calculator to calculate AP bias information of APs 440.

In some demonstrative embodiments, the plurality of devices 402 may compute (1) the range from an AP 440, e.g., without doing any cancelation operation to reduce, mitigate and/or cancel the bias of the AP 440. A device 402 may compute the range, for example, by averaging on several measurements, e.g., to reduce a variance of the range measurement.

In some demonstrative embodiments, the plurality of devices 402 may report (2) the computed ranges to server 410. A report from a device 402 with respect to AP 440 may include, for example, at least a computed range from AP 440, and an identifier, e.g., a MAC address, of the AP, from which the range was measured.

In some demonstrative embodiments, the server 410 may download and/or retrieve (3) from Map DB 406 the map and AP position corresponding to an AP, e.g., AP 440, for which a report was received from a device 402, e.g., according to the AP MAC address.

In some demonstrative embodiments, the bias calculator in server 410 may calculate (4) AP bias information of AP 440, e.g., as described below.

In some demonstrative embodiments, the bias calculator may perform a first calculation to compute what may be the physical nearest place, in which a measurement from the AP 440 could have being taken, e.g. beneath or nearest to the AP 440 in the same floor. This calculation may be, for example, based on a map, which may show which are the possible places a device can be, and the AP 440 position in the same coordinates as the map.

In some demonstrative embodiments, the bias calculator of server 410 may perform a second calculation to extract at least one minimum range that was measured with AP 440. The minimum range may be assumed to be taken from the nearest place ("the physical range") that was calculated in the first calculation.

In some demonstrative embodiments, subtracting the physical range from the computed minimum range may provide, for example, the real bias of the AP.

In some demonstrative embodiments, there may be a need to update the Bias Db 406 with respect to the calculated AP bias information, e.g., if no previous reading is in the bias DB 406, or more updated measurements are received.

As shown in FIG. 4, server 410 may update the Bias DB 406 (5) with the new and more accurate Bias information of an AP of APs 440.

Figure 5:
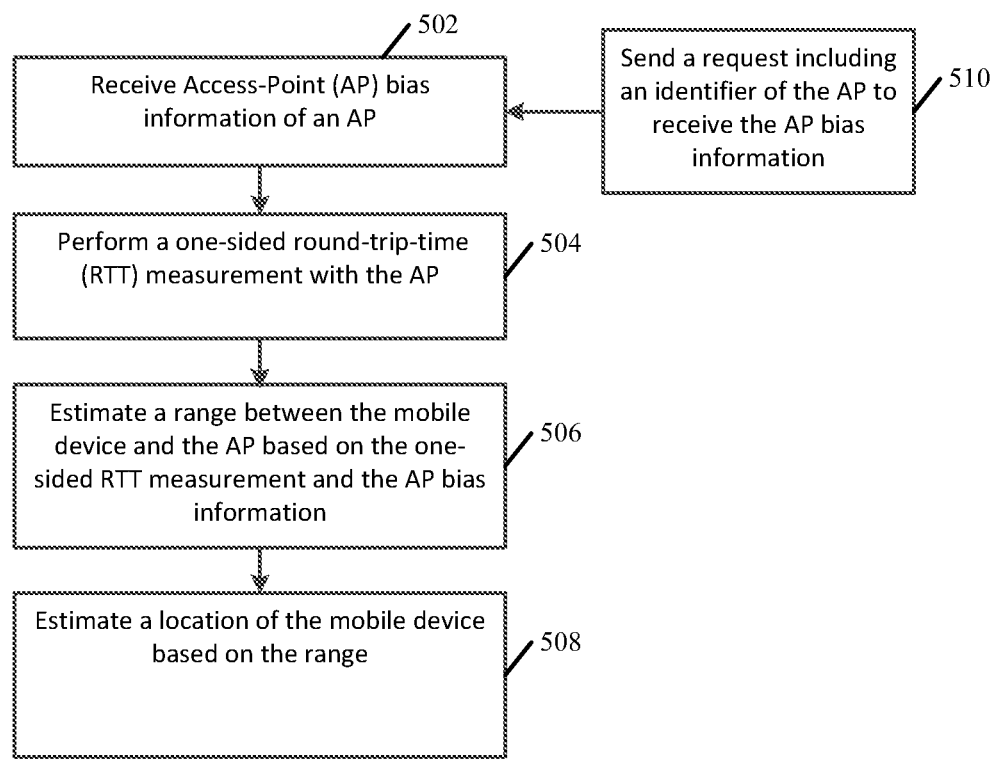
FIG. 5 is a schematic flow-chart illustration of a method of one-sided round-trip-time (RTT) measurement, in accordance with some demonstrative embodiments.

Reference is made to FIG. 5, which schematically illustrates a method of one-sided RTT measurement, in accordance with some demonstrative embodiments. For example, one or more of the operation of FIG. 5 may be performed by a mobile device, device 102 (FIG. 1), a system, system 100 (FIG. 1), a server, server 160 (FIG. 1), a location estimator 115 (FIG. 1), a bias calculator 165 (FIG. 1), a controller, e.g., controller 122 (FIG. 1), and/or controller 164 (FIG. 1); a radio, e.g., radio 114 (FIG. 1); and/or a message processor, e.g., message processor 128 (FIG. 1), and/or message processor 168 (FIG. 1).

As indicated at block 502, the method may include receiving Access-Point (AP) bias information of an AP. For example, device 102 (FIG. 1) may receive the AP bias information of device 140 (FIG. 1), e.g., as described above.

As indicated at block 510, the method may include sending a request to receive the AP bias information, the request including an identifier of the AP. For example, device 102 (FIG. 1) may send to server 160 (FIG. 1) the request 121 (FIG. 1) including the identifier of device 140 (FIG. 1), e.g., as described above.

As indicated at block 504, the method may include performing a one-sided round-trip-time (RTT) measurement with the AP. For example, device 102 (FIG. 1) may perform the one-sided RTT measurement with device 140 (FIG. 1), e.g., as described above.

As indicated at block 506, the method may include estimating a range between the mobile device and the AP based on the one-sided RTT measurement and the AP bias information. For example, location estimator (FIG. 1) may estimate the range between device 102 (FIG. 1) and device 140 (FIG. 1) based on the one-sided RTT measurement and the AP bias information of device 140 (FIG. 1), e.g., as described above.

As indicated at block 508, the method may include estimating a location of the mobile device based on the range. For example, location estimator (FIG. 1) may estimate the location of mobile device 102 (FIG. 1) based on the estimated range, e.g., as described above.

Figure 6:
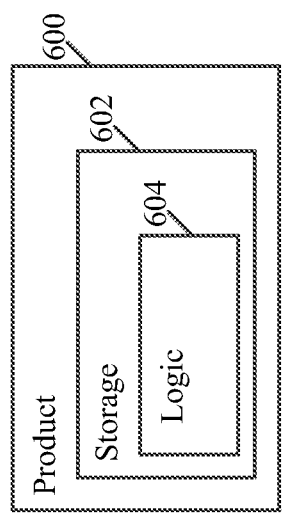
FIG. 6 is a schematic illustration of a product of manufacture, in accordance with some demonstrative embodiments.

Reference is made to FIG. 6, which schematically illustrates a product of manufacture 600, in accordance with some demonstrative embodiments. Product 600 may include a non-transitory machine-readable storage medium 602 to store logic 604, which may be used, for example, to perform at least part of the functionality of device 102 (FIG. 1), transmitters 118 and/or 148 (FIG. 1), receivers 116 and/or 146 (FIG. 1), controllers 124 and/or 154 (FIG. 1), message processors 128 and/or 158 (FIG. 1), location estimator 115 (FIG. 1), bias calculator 165 (FIG. 1), devices 402 (FIG. 4), cloud 410 (FIG. 4), bias DB 406 (FIG. 4), and/or Map DB 408 (FIG. 4), and/or to perform one or more operations of FIGS. 2, 3, 4 and/or 5. The phrase "non-transitory machine-readable medium" is directed to include all computer-readable media, with the sole exception being a transitory propagating signal.

In some demonstrative embodiments, product 600 and/or machine-readable storage medium 602 may include one or more types of computer-readable storage media capable of storing data, including volatile memory, non-volatile memory, removable or non-removable memory, erasable or non-erasable memory, writeable or re-writeable memory, and the like. For example, machine-readable storage medium 602 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 604 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 604 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry and logic configured to trigger a mobile device to receive bias information of an Access-Point (AP); perform a one-sided round-trip-time (RTT) measurement with the AP; and estimate a range between the mobile device and the AP based on the one-sided RTT measurement and the bias information.

Example 2 includes the subject matter of Example 1, and optionally, being configured to trigger the mobile device to send a request to receive the bias information, the request comprising an identifier of the AP.

Example 3 includes the subject matter of Example 1 or 2, and optionally, configured to trigger the mobile device to estimate a location of the mobile device based on the range.

Example 4 includes the subject matter of any one of Examples 1-3, and optionally, being configured to trigger the mobile device to measure one or more ranges with one or more APs, and to send one or more reports comprising the one or more ranges measurements and one or more identifiers of the one or more APs.

Example 5 includes the subject matter of any one of Examples 1-4, and optionally, comprising a radio.

Example 6 includes the subject matter of any one of Examples 1-5, and optionally, comprising one or more antennas, a memory, and a processor.

Example 7 includes the subject matter of any one of Examples 1-6, and optionally, the apparatus being the mobile device.

Example 8 includes a method to be performed at a mobile device, the method comprising receiving bias information of an Access-Point (AP); performing a one-sided round-trip-time (RTT) measurement with the AP; and estimating a range between the mobile device and the AP based on the one-sided RTT measurement and the bias information.

Example 9 includes the subject matter of Example 8, and optionally, comprising sending a request to receive the bias information, the request comprising an identifier of the AP.

Example 10 includes the subject matter of Example 8 or 9, and optionally, comprising estimating a location of the mobile device based on the range.

Example 11 includes the subject matter of any one of Examples 8-10, and optionally, comprising measuring one or more ranges with one or more APs, and sending one or more reports comprising the ranges and one or more identifiers of the one or more APs.

Example 12 includes a product comprising one or more tangible computer-readable non-transitory storage media comprising computer-executable instructions operable to, when executed by at least one computer processor, enable the at least one computer processor to perform one or more operations at a mobile device, the operations comprising receiving bias information of an Access-Point (AP); performing a one-sided round-trip-time (RTT) measurement with the AP; and estimating a range between the mobile device and the AP based on the one-sided RTT measurement and the bias information.

Example 13 includes the subject matter of Example 12, and optionally, wherein the operations comprise sending a request to receive the bias information, the request comprising an identifier of the AP.

Example 14 includes the subject matter of Example 12 or 13, and optionally, wherein the operations comprise estimating a location of the mobile device based on the range.

Example 15 includes the subject matter of any one of Examples 12-14, and optionally, wherein the operations comprise measuring one or more ranges with one or more APs, and sending one or more reports comprising the one or more ranges and one or more identifiers of the one or more APs.

Example 16 includes an apparatus of wireless communication by a mobile device, the apparatus comprising means for receiving bias information of an Access-Point (AP); means for performing a one-sided round-trip-time (RTT) measurement with the AP; and means for estimating a range between the mobile device and the AP based on the one-sided RTT measurement and the bias information.

Example 17 includes the subject matter of Example 16, and optionally, comprising means for sending a request to receive the bias information, the request comprising an identifier of the AP.

Example 18 includes the subject matter of Example 16 or 17, and optionally, comprising means for estimating a location of the mobile device based on the range.

Example 19 includes the subject matter of any one of Examples 16-18, and optionally, comprising means for measuring one or more ranges with one or more APs, and sending one or more reports comprising the one or more ranges and one or more identifiers of the one or more APs.

Example 20 includes a mobile device comprising a radio configured to receive bias information of an Access-Point (AP); and a location estimator configured to perform a one-sided round-trip-time (RTT) measurement with the AP, and configured to estimate a range between the mobile device and the AP based on the one-sided RTT measurement and the bias information.

Example 21 includes the subject matter of Example 20, and optionally, wherein the radio is configured to send a request to receive the bias information, the request comprising an identifier of the AP.

Example 22 includes the subject matter of Example 20 or 21, and optionally, wherein the location estimator is configured to estimate a location of the mobile device based on the range.

Example 23 includes the subject matter of any one of Examples 20-22, and optionally, wherein the location estimator is configured to measure one or more ranges with one or more APs, and wherein the radio is configured to send one or more reports comprising the one or more ranges and one or more identifiers of the one or more APs.

Example 24 includes the subject matter of any one of Examples 20-23, and optionally, comprising one or more antennas, a memory, and a processor.

Example 25 includes a server to provide information to a mobile device, the server comprising a communication interface configured to receive from a mobile device a request to receive bias information of an Access Point (AP), the request comprising an identifier of the AP; and a bias calculator configured to determine the bias information of the AP based on the identifier, and to send the bias information of the AP to the mobile device via the communication interface.

Example 26 includes the subject matter of Example 25, and optionally, wherein the communication interface is configured to receive from a plurality of wireless devices a plurality of reports corresponding to the AP, a report from a wireless device comprising an identifier of the AP, and a calculated range between the wireless device and the AP, and wherein the bias calculator is configured to determine the bias information of the AP, based on the plurality of reports and mapping information corresponding to a location of the AP.

Example 27 includes the subject matter of Example 26, and optionally, wherein the bias calculator is configured to determine the bias information of the AP, based on a minimal calculated range in the plurality of reports.

Example 28 includes the subject matter of Example 27, and optionally, wherein the bias calculator is configured to determine, based on the mapping information, an estimated location of a wireless device from which the minimal calculated range is reported, and configured to determine the bias information of the AP, based on the location of the AP and the estimated location of the wireless device.

Example 29 includes the subject matter of Example 27 or 28, and optionally, wherein the bias calculator is configured to update the bias information of the AP, based on a received report comprising a calculated range, which is shorter than the minimal calculated range.

Example 30 includes the subject matter of any one of Examples 25-29, and optionally, comprising a database (DB), wherein the bias calculator is configured to store in the DB a plurality of bias information elements corresponding to a plurality of APs having a respective plurality of identifiers, and configured to retrieve from the DB the bias information of the AP based on the identifier of the AP.

Example 31 includes the subject matter of any one of Examples 25-30, and optionally, comprising a memory, and a processor.

Example 32 includes an apparatus comprising circuitry and logic configured to trigger a server to receive from a mobile device a request to receive bias information of an Access Point (AP), the request comprising an identifier of the AP; determine the bias information of the AP based on the identifier; and send the bias information of the AP to the mobile device.

Example 33 includes the subject matter of Example 32, being configured to trigger the server to receive from a plurality of wireless devices a plurality of reports corresponding to the AP, a report from a wireless device comprising an identifier of the AP, and a calculated range between the wireless device and the AP, and being configured to trigger the server to determine the bias information of the AP, based on the plurality of reports and mapping information corresponding to a location of the AP.

Example 34 includes the subject matter of Example 33, and optionally, being configured to trigger the server to determine the bias information of the AP, based on a minimal calculated range in the plurality of reports.

Example 35 includes the subject matter of Example 34, and optionally, being configured to trigger the server to determine, based on the mapping information, an estimated location of a wireless device from which the minimal calculated range is reported, and being configured to trigger the server to determine the bias information of the AP, based on the location of the AP and the estimated location of the wireless device.

Example 36 includes the subject matter of Example 34 or 35, and optionally, being configured to trigger the server to update the bias information of the AP, based on a received report comprising a calculated range, which is shorter than the minimal calculated range.

Example 37 includes the subject matter of any one of Examples 32-36, and optionally, being configured to trigger the server to store in a database (DB) a plurality of bias information elements corresponding to a plurality of APs having a respective plurality of identifiers, and to retrieve the bias information of the AP based on the identifier of the AP.

Example 38 includes the subject matter of any one of Examples 32-37, and optionally, comprising a memory, and a processor.

Example 39 includes a method to be performed at a server, the method comprising receiving from a mobile device a request to receive bias information of an Access Point (AP), the request comprising an identifier of the AP; determining the bias information of the AP based on the identifier; and sending the bias information of the AP to the mobile device.

Example 40 includes the subject matter of Example 39, and optionally, comprising receiving from a plurality of wireless devices a plurality of reports corresponding to the AP, a report from a wireless device comprising an identifier of the AP, and a calculated range between the wireless device and the AP; and determining the bias information of the AP, based on the plurality of reports and mapping information corresponding to a location of the AP.

Example 41 includes the subject matter of Example 40, and optionally, comprising determining the bias information of the AP, based on a minimal calculated range in the plurality of reports.

Example 42 includes the subject matter of Example 41, and optionally, comprising determining, based on the mapping information, an estimated location of a wireless device from which the minimal calculated range is reported; and determining the bias information of the AP, based on the location of the AP and the estimated location of the wireless device.

Example 43 includes the subject matter of Example 41 or 42, and optionally, comprising updating the bias information of the AP, based on a received report comprising a calculated range, which is shorter than the minimal calculated range.

Example 44 includes the subject matter of any one of Examples 39-43, and optionally, comprising storing in a database (DB) a plurality of bias information elements corresponding to a plurality of APs having a respective plurality of identifiers; and retrieving the bias information of the AP based on the identifier of the AP.

Example 45 includes a product comprising one or more tangible computer-readable non-transitory storage media comprising computer-executable instructions operable to, when executed by at least one computer processor, enable the at least one computer processor to perform one or more operations at a server, the operations comprising receiving from a mobile device a request to receive bias information of an Access Point (AP), the request comprising an identifier of the AP; determining the bias information of the AP based on the identifier; and sending the bias information of the AP to the mobile device.

Example 46 includes the subject matter of Example 45, and optionally, wherein the operations comprise receiving from a plurality of wireless devices a plurality of reports corresponding to the AP, a report from a wireless device comprising an identifier of the AP, and a calculated range between the wireless device and the AP; and determining the bias information of the AP, based on the plurality of reports and mapping information corresponding to a location of the AP.

Example 47 includes the subject matter of Example 46, and optionally, wherein the operations comprise determining the bias information of the AP, based on a minimal calculated range in the plurality of reports.

Example 48 includes the subject matter of Example 47, and optionally, wherein the operations comprise determining, based on the mapping information, an estimated location of a wireless device from which the minimal calculated range is reported; and determining the bias information of the AP, based on the location of the AP and the estimated location of the wireless device.

Example 49 includes the subject matter of Example 47 or 48, and optionally, wherein the operations comprise updating the bias information of the AP, based on a received report comprising a calculated range, which is shorter than the minimal calculated range.

Example 50 includes the subject matter of any one of Examples 45-49, and optionally, wherein the operations comprise storing in a database (DB) a plurality of bias information elements corresponding to a plurality of APs having a respective plurality of identifiers; and retrieving the bias information of the AP based on the identifier of the AP.

Example 51 includes an apparatus of wireless communication by a server, the apparatus comprising means for receiving from a mobile device a request to receive bias information of an Access Point (AP), the request comprising an identifier of the AP; means for determining the bias information of the AP based on the identifier; and means for sending the bias information of the AP to the mobile device.

Example 52 includes the subject matter of Example 51, and optionally, comprising means for receiving from a plurality of wireless devices a plurality of reports corresponding to the AP, a report from a wireless device comprising an identifier of the AP, and a calculated range between the wireless device and the AP; and determining the bias information of the AP, based on the plurality of reports and mapping information corresponding to a location of the AP.

Example 53 includes the subject matter of Example 52, and optionally, comprising means for determining the bias information of the AP, based on a minimal calculated range in the plurality of reports.

Example 54 includes the subject matter of Example 53, and optionally, comprising means for determining, based on the mapping information, an estimated location of a wireless device from which the minimal calculated range is reported; and determining the bias information of the AP, based on the location of the AP and the estimated location of the wireless device.

Example 55 includes the subject matter of Example 53 or 54, and optionally, comprising means for updating the bias information of the AP, based on a received report comprising a calculated range, which is shorter than the minimal calculated range.

Example 56 includes the subject matter of any one of Examples 51-55, and optionally, comprising means for storing in a database (DB) a plurality of bias information elements corresponding to a plurality of APs having a respective plurality of identifiers; and means for retrieving the bias information of the AP from the plurality of bias information elements based on the identifier of the AP.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A server to provide information to a mobile device, the server comprising:
   a communication interface configured to receive from a plurality of wireless devices a plurality of reports corresponding to an Access Point (AP), a report from a wireless device comprising an identifier of the AP and a calculated range between the wireless device and the AP, the communication interface configured to receive from the mobile device a request to receive bias information of the AP, the request comprising the identifier of the AP; and
   a bias calculator configured to determine the bias information of the AP based on the identifier of the AP, and to send the bias information of the AP to the mobile device via the communication interface, the bias calculator configured to determine the bias information of the AP based on a minimal calculated range in the plurality of reports and mapping information corresponding to a location of the AP, the bias calculator configured to update the bias information of the AP based on a received report comprising a calculated range, which is shorter than the minimal calculated range.

2. The server of claim 1, wherein the bias calculator is configured to determine, based on the mapping information, an estimated location of a wireless device from which the minimal calculated range is reported, and configured to determine the bias information of the AP, based on the location of the AP and the estimated location of the wireless device.

3. The server of claim 1 comprising a database (DB), wherein the bias calculator is configured to store in the DB a plurality of bias information elements corresponding to a plurality of APs having a respective plurality of identifiers, and configured to retrieve from the DB the bias information of the AP based on the identifier of the AP.

4. The server of claim 1 comprising a memory, and a processor.

5. A product comprising one or more tangible computer-readable non-transitory storage media comprising computer-executable instructions operable to, when executed by at least one computer processor, enable the at least one computer processor to cause a server to:

receive from a plurality of wireless devices a plurality a reports corresponding to an Access Point (AP), a report from a wireless device comprising an identifier of the AP and a calculated range between the wireless device and the AP:

determine the bias information of the AP based on a minimal calculated range in the plurality of reports and mapping information corresponding to a location of the AP:

update the bias information of the AP based on a received report comprising a calculated range, which is shorter than the minimal calculated range;

receive from a mobile device a request to receive bias information of the AP, the request comprising the identifier of the AP;

determine the bias information of the AP based on the identifier of the AP; and send the bias information of the AP to the mobile device.

6. The product of claim 5, wherein the instructions, when executed, cause the server to determine, based on the mapping information, an estimated location of a wireless device from which the minimal calculated range is reported; and determine the bias information of the AP, based on the location of the AP and the estimated location of the wireless device.

7. The product of claim 5, wherein the instructions, when executed, cause the server to store in a database (DB) a plurality of bias information elements corresponding to a plurality of APs having a respective plurality of identifiers; and retrieve the bias information of the AP based on the identifier of the AP.

* * * * *

UNITED STATES PATENT AND TRADEMARK OFFICE
CERTIFICATE OF CORRECTION

PATENT NO.        : 9,756,598 B2
APPLICATION NO.   : 14/748525
DATED             : September 5, 2017
INVENTOR(S)       : Gaby Prechner et al.

Page 1 of 1

It is certified that error appears in the above-identified patent and that said Letters Patent is hereby corrected as shown below:

In the Claims

Column 25, Line 18, Claim 5, delete "receive from a plurality of wireless devices a plurality a" and insert -- receive from a plurality of wireless devices a plurality of --, therefor.

Signed and Sealed this
Twenty-sixth Day of December, 2017

Joseph Matal
*Performing the Functions and Duties of the*
*Under Secretary of Commerce for Intellectual Property and*
*Director of the United States Patent and Trademark Office*